United States Patent [19]
Holt et al.

[11] Patent Number: 5,522,421
[45] Date of Patent: *Jun. 4, 1996

[54] FLUID PRESSURE REGULATOR

[75] Inventors: Daniel A. Holt, 5235 Tacco, San Antonio, Tex. 78244; Trevor K. Markham, San Antonio, Tex.

[73] Assignee: Daniel A. Holt, San Antonio, Tex.

[ * ] Notice: The term of this patent shall not extend beyond the expiration date of Pat. No. 5,411,053.

[21] Appl. No.: 376,767

[22] Filed: Jan. 23, 1995

Related U.S. Application Data

[63] Continuation-in-part of Ser. No. 270,135, Jul. 1, 1994, Pat. No. 5,411,053.

[51] Int. Cl.$^6$ ..................................................... G05D 16/04
[52] U.S. Cl. ................... 137/505.22; 137/505.25; 251/64
[58] Field of Search ............... 137/505.22, 505.25, 137/505.28, 505.26, 505.29, 505.36, 505.37; 251/64

[56] References Cited

U.S. PATENT DOCUMENTS

| | | | |
|---|---|---|---|
| 2,897,833 | 8/1959 | Seeler | 137/505.22 X |
| 3,094,141 | 6/1963 | Maienknecht | 137/505.25 |
| 3,098,501 | 7/1963 | McLeod | 137/505.22 X |
| 5,379,761 | 1/1995 | Schuler | 137/505.25 X |

*Primary Examiner*—Stephen Hepperle
*Attorney, Agent, or Firm*—Gunn, Lee & Miller

[57] ABSTRACT

A fluid pressure regulator capable of adjustably setting a cut-off pressure between an upper and a lower limit having a two-piece valve body where the two pieces are threadably joined such that adjusting the distance between the two pieces of the valve body moves a piston stem valve operating a high pressure port towards or away from the high pressure port while not changing the distance between the spring engaging the piston and the piston head.

17 Claims, 5 Drawing Sheets

FLUID PRESSURE REGULATOR

This application is a continuation-in-part of U.S. application Ser. No. 08/270,135 filed Jul. 1, 1994, now U.S. Pat. No. 5,411,053.

FIELD OF THE INVENTION

Fluid pressure regulators, more specifically a fluid pressure regulator capable of adjustably selecting a cut-off pressure between an upper and a lower limit.

BACKGROUND OF THE INVENTION

Fluid pressure regulators regulate the flow of fluid between a high pressure port and a low pressure port. Typically, regulators are preset to allow fluid to flow when pressure at a low pressure port drops below a predetermined upper limit.

One type of pre-set regulator is known as a piston-type regulator. This regulator typically comprises a valve body, a hollow stem piston and a spring. When fluid pressure at the low pressure port of the valve body drops below a pre-set minimum, a coil spring operating on the underside of the piston head lifts the piston operated stem valve off the high pressure inlet port to provide fluid flow between the inlet port and the outlet port. At the same time, some of the fluids flow up the hollow piston stem to be captured in the cylinder head between the head of the valve body and piston face. As pressure at the outlet port increases, so does back pressure in the cylinder forcing the piston down and the piston stem valve against the high pressure inlet port.

U.S. Pat. No. 4,226,257 (Trinkwalder, 1978) discloses a regulator similar in structure and operating similar to that set forth in the previous paragraph. In such a piston type regulator, the cut-off pressure between the high (inlet) port and low (outlet) port is a function of the resistance force provided by the spring engaging, at one end, the valve body and at a second end, the underside of the sliding piston. The stouter the spring, the higher the cut-off pressure, the weaker the spring, the lower the cut-off pressure.

Such regulators are preset and have a fixed cut-off pressure. Changing the cut-off pressure requires changing the spring to a stouter or weaker spring. These regulators are useful for many purposes. However, a need exists for a simple piston type fluid pressure regulator wherein the cut-off pressure is adjustable between an upper and a lower limit. For example, in the air conditioning business, one may wish to recharge the system with a fluid under, for example, 60 pounds of pressure per square inch and use the same regulator to charge a system with a fluid under, say, 100 pounds of pressure per square inch. Additionally, certain fluid pressure testing equipment presently requires a number of pre-set regulators in 20 to 40 foot intervals. Applicant's invention provides, however, in a unique piston type fluid regulator, the capability of providing in a single regulator a device capable of adjustably selecting a cut-off pressure.

SUMMARY OF THE INVENTION

Applicant provides for a piston type fluid pressure regulator with a two-piece valve body, the two portions being adjustably joined. In the second portion of the regulator valve body is provided a piston chamber for receipt therein of a piston, the piston having a hollow stem open to the piston face, and engaging a spring and also engaging the underside of the piston head. Adjustably articulating with the second valve body, typically in a thread engageable manner, is a first valve body that has an intermediate chamber with an inlet port and an outlet port for receiving, in fluid sealing relation, the stem of the piston.

Applicant's invention provides a two-piece valve body which allows the distance between the face of the piston operated stem valve of the piston and the high pressure inlet port with which it engages, to be adjustably set. By doing so, the result will be changing the cut-off pressure at the low end port. That is, if the distance between the face of the stem valve and the high pressure inlet port is increased by threadably adjusting the two pieces of the valve body, then greater pressure (the spring would require more linear compression) will be required to shut off the high pressure port. By decreasing the distance between the face of the stem valve and the low end port, less pressure will be required to seat the stem valve against the high pressure port and cut off the high pressure source.

Applicant has provided a two-piece valve body in which a first portion and a second portion join together to provide an intermediate chamber between a high pressure and a low pressure port. The intermediate chamber is in communication with a cylinder head such that an increase in pressure in the intermediate chamber drives the piston downward against the resistance of a coil spring in the valve body moving the valve stem towards the valve seat and the high pressure port. A decrease in pressure in the intermediate chamber allows the piston head to rise and the stem valve to move away from the high pressure port.

It is, therefore, the object of Applicant's present invention to provide, in a piston type fluid pressure regulator, a means of randomly selecting a cut-off pressure between an upper and lower limit by utilizing a two-piece valve body capable of adjustably setting the distance between a high pressure port and piston operated stem valve while maintaining a fixed distance between the spring and the piston.

DETAILED DESCRIPTION OF THE PREFERRED EMBODIMENT

Figure 1:
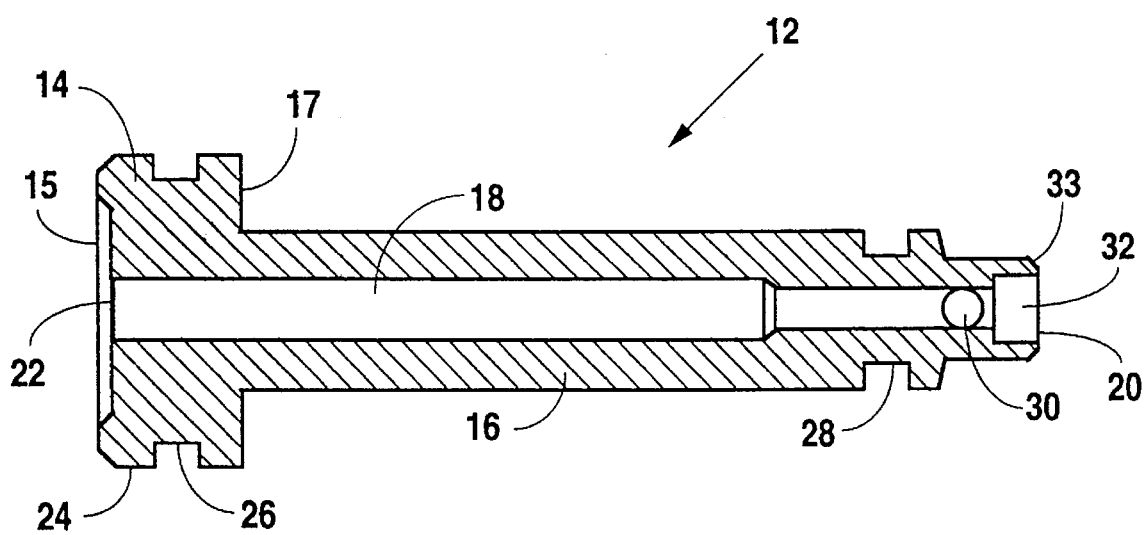
FIG. 1 is a side elevational cut-away view of the piston of Applicant's present invention.

Perhaps it is most effective to illustrate and discuss the separate pieces of Applicant's present invention at the outset and finish with the way the pieces fit together into a unitary, functional regulator followed by a brief description of the manner in which the regulator operates. With that in mind, we turn now to FIG. 1 which illustrates the preferred embodiment of piston (12) of Applicant's present invention. In general, the piston is seen to be not much different than pistons found in prior art piston regulators. Piston (12) is seen to have cylindrical piston head (14) with a face or top surface (15) at one end of piston head (14). Piston stem (16) is, like head (14) cylindrical and is coincident with the longitudinal axis of piston (12). It is hollow, having an external diameter less than that of piston head (14). Stem (16) joins underside or bottom of bottom surface (17) of piston head (14) as illustrated in FIG. 1. As stated, stem (16) is hollow having a longitudinal channel (18) along the longitudinal axis thereof extending from a first end (20) at a stem face and a second end (22) open to piston face (15). Piston head (14) has side walls (24) which are notched or grooved to define a sealing ring groove (26). Likewise, near first end (20) of channel (18) are walls defining yet another sealing ring groove (28), the walls of the groove being integral with the walls defining the outer surface of stem (16). More details of first end (20) reveal that channel (18) communicates through stem at ports (30). Further, first end (20) of stem (16) is seen to have walls defining an indent portion (32) designed to accommodate a seat, adjacent a stem lip (33). Last, both sealing ring grooves (26) and (28) are dimensioned to accept sealing rings for fluid sealing relationship with walls as more particularly set forth with reference to FIGS. 2 and 3 more particularly below.

Figure 2:
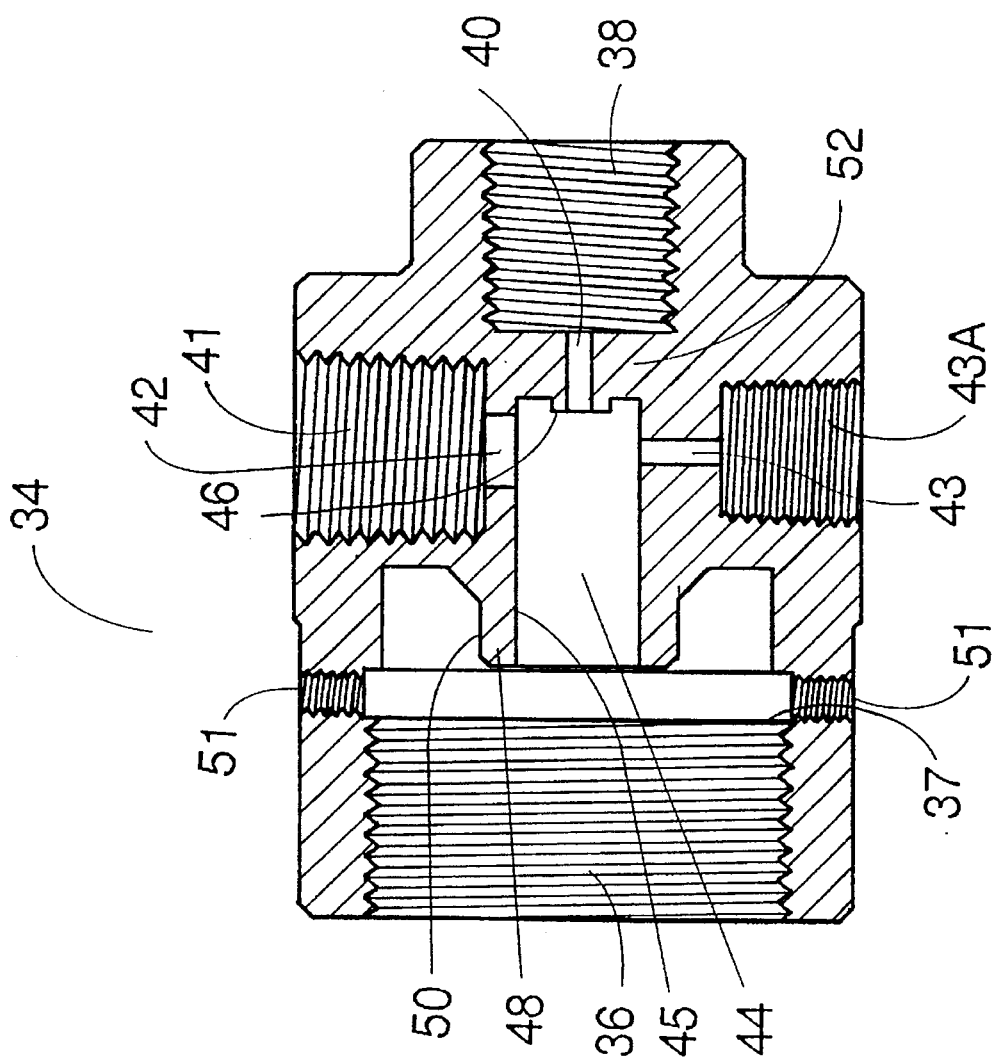
FIG. 2 is a side elevational cut-away view through the center of the first valve body of Applicant's present invention.

FIG. 2 illustrates a first valve body (34) having a generally irregular exterior shape. First valve body (34) is comprised of a first threaded portion (36) terminating at shoulder (37) defining, in part, some of the inner walls of the valve body. Adjacent to shoulder (37) are threaded passageways (51) designed for the receipt of set screws therein. It can be seen that the inner walls of first valve body (34) also have a second threaded portion (38) terminating at a high pressure port (40) and a third threaded portion (41) terminating at low pressure port (42). Auxiliary port (43) provides communication between intermediate chamber (44) and fourth threaded portion (43a). The first threaded portion (36) will receive the second valve body as set forth in more detail with respect to FIG. 3 below. The second threaded portion (38) is designed to accept the high pressure fluid vessel connective device. The third threaded portion (41) engages the low pressure source and the fourth threaded portion (43a) engages a pressure gauge to measure pressure in intermediate chamber (44).

A portion of the inner walls of first valve body (34) are dimensioned to provide a cylindrical intermediate chamber (44) which communicates with the area outside valve body (34) through both ports (40) and (42). Intermediate chamber (44) is defined by cylindrical inner walls (45). Adjoining cylindrical walls (45) and part of the walls defining intermediate chamber (44) are a lip (46) which encircles one end of high pressure port (40) and base (52) from which lip (46) projects. It is further seen in FIG. 2 how cylindrical inner walls (45) make up, in part, a portion of stem receiving member (48) which is also defined, in part, by stem receiving member walls (50). The function of the structure of first valve body (34) and the details related with the discussion of FIG. 2 set forth herein above will become more apparent with reference to FIG. 5 below.

Figure 3:
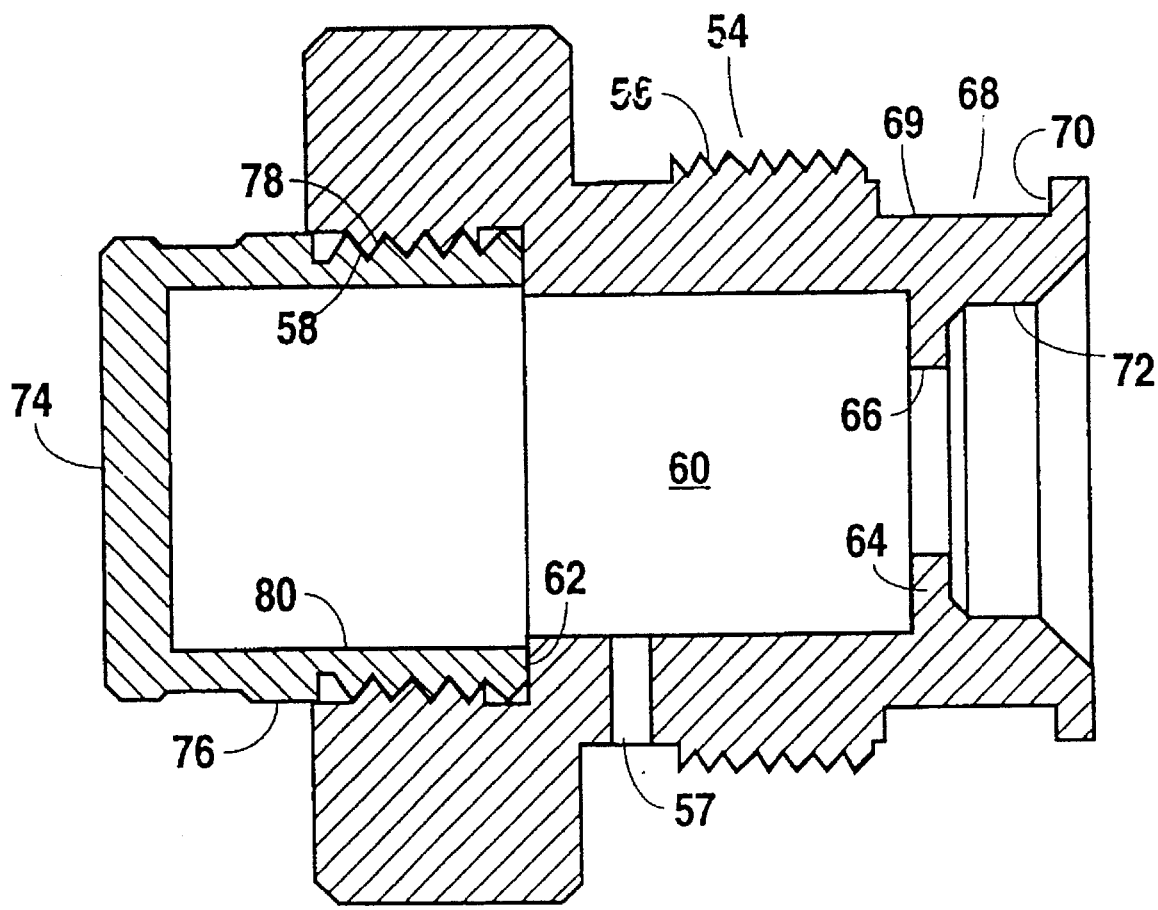
FIG. 3 is a side elevational cut-away view through the center of the second valve body, including cylinder head, of Applicant's present invention.

FIG. 3 illustrates a second valve body (54) having an outer surface defined in part by a first threaded portion (56) and having an inner surface defined in part by a second threaded portion (58). The inner surface also has walls defining spring chamber (60) dimensioned for receipt of a spring therein. A shoulder (62) separates second threaded portion (58) from spring chamber (60). A partition (64) at the base of spring chamber (60) provides a support base for a coil spring or other bias means and terminates at stem bore (66) dimensioned for receipt of stem (16) therethrough. Annular gap (68) is provided in the outer walls of second valve body (54) for engagement with set screws as more particularly described with reference to FIG. 4 below. Annular gap (68) is defined in part by wall (69) and at one end by shoulder (70). An inner wall portion (72) of second valve body (54) is designed for receipt of stem receiving member (48) therein, as noted by the similarity between their shapes. Relief port (57) is provided to maintain ambient pressure in spring chamber (66).

FIG. 3 also illustrates a cylinder head (74) having outer walls (76) which include a threaded portion (78) and having inner walls (80) which are cylindrically shaped and dimensioned to slidably accept the piston head (14) therein. Cylinder head (74) is screwed into second valve body (54) such that threaded portion (78) engages second threaded portion (58) of second valve body (54), and becoming an integral part of second valve body, hereinafter referred to as the second valve body.

Figure 4:
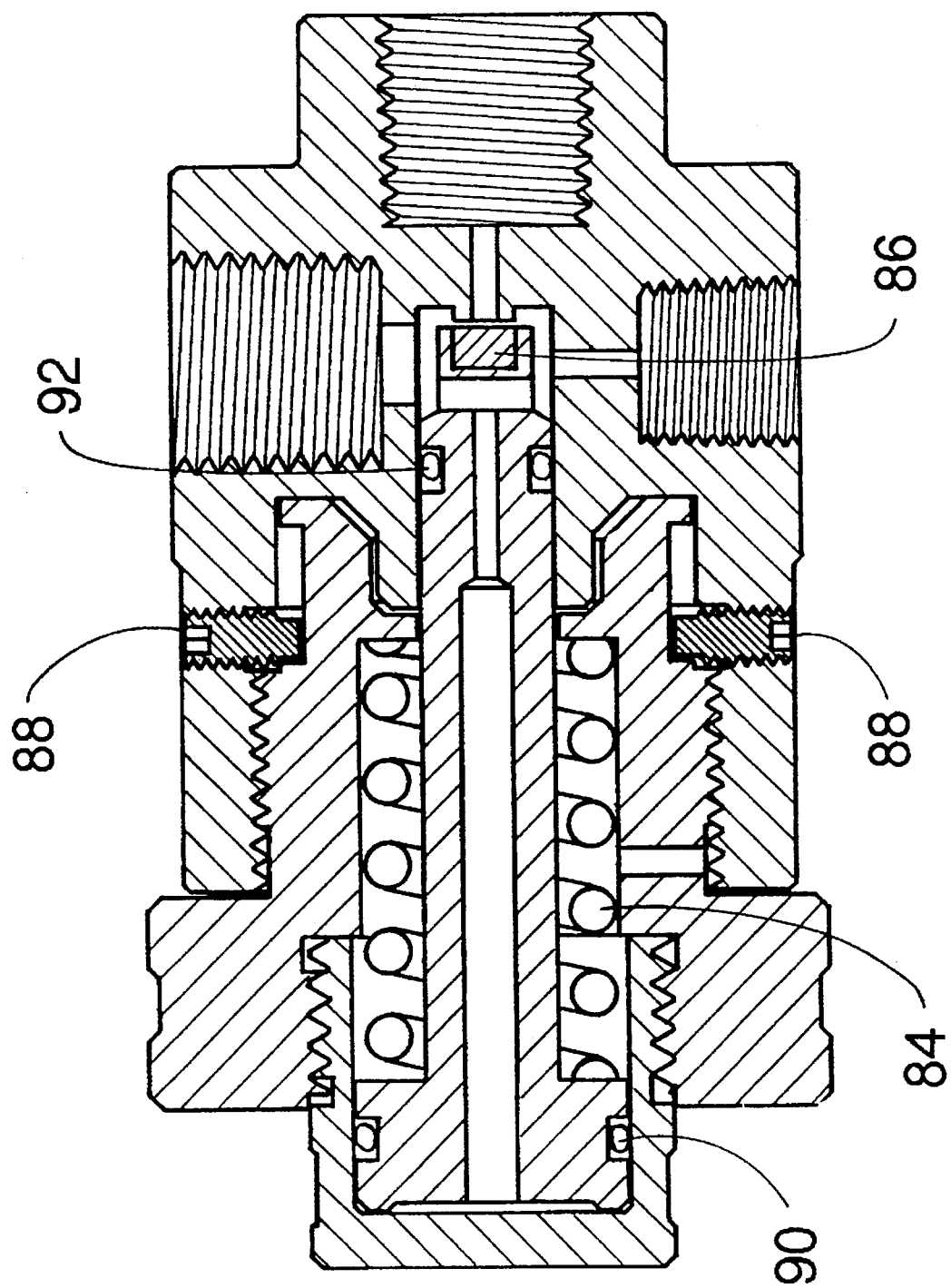
FIG. 4 is a cut-away elevational view of the entire regulator with first and second valve bodies, piston, spring, piston stem, and port sealing means.

With reference to FIG. 4, it is seen that piston (12) is inserted with coil or disk spring (84) over stem (16) with first valve body (34) threadably engaged to second valve body (54). More particularly, first threaded portion (36) of first valve body (34) engages first threaded portion (56) of second valve body (54). Stem face (20) is adjacent seat (86) to contact high pressure port (40) at lip (46). Seat (86) is typically cylindrically shaped and comprised of a durable, non-metallic material, such as Teflon. In operation, typically seat (86) will contact lip (46) of high pressure port (40). At this point, spring (84) has contacted at a first end, underside or bottom surface (17) of piston head (14) and at the other end is seated against partition (64).

FIG. 4 also illustrates the manner in which set screws (88) are typically and preferably in close proximity to the wall (69) of annular gap (68) and, in conjunction with shoulder (70), act as a means to lock the two valve bodies together to prevent unintended uncoupling. More specifically, FIG. 4 illustrates the use of set screws 88 which, when threaded through the walls of first valve body (34) such that they are preferably locked in close proximity to the wall (69) of annular gap (68), can prevent, by interference with shoulder (70), the two valve bodies from separating. As set forth above with reference to the preceding figures, sealing means are required at grooves (26) and (28). FIG. 4 illustrates the use of "O" rings (90) and (92) to effect a substantially fluid-tight seal. Thus, it is important for the set screws and shoulder to be situated such that they engage one another before the threads engaging the two valve bodies disengage.

In operation, the two valve bodies are threaded together until the valve stem comes into proximity of the high pressure port and then adjusted so that fluid at the high pressure port may flow into the intermediate chamber. The high pressure fluid source is connected to the second threaded portion and the low pressure vessel is threaded to the third threaded portion of the first valve body. The fourth threaded portion will typically provide a gauge for measuring pressure in the intermediate chamber. With the gauges and vessels attached to the first valve body in fluid sealing relation, the high pressure source is vented to the high pressure port which will fill the intermediate chamber and drive the piston down to seat the high pressure valve when pressure in the intermediate chamber, generated at the low pressure port drives the piston head and stem valve against the high pressure port. A suitable gauge located in the fourth threaded portion will measure the pressure at which such cut-off occurs. The user may then adjustably increase or decrease that cut-off pressure, changing the distance between the two valve bodies by holding one valve body while rotating the other. Moving the stem valve away from the high pressure port will increase the cut-off pressure, moving it towards the high pressure port will decrease the cut-off pressure. By adjustably locating this distance while watching the intermediate chamber gauge (not shown), the user may adjustably set the cut-off pressure desired.

Figure 5:
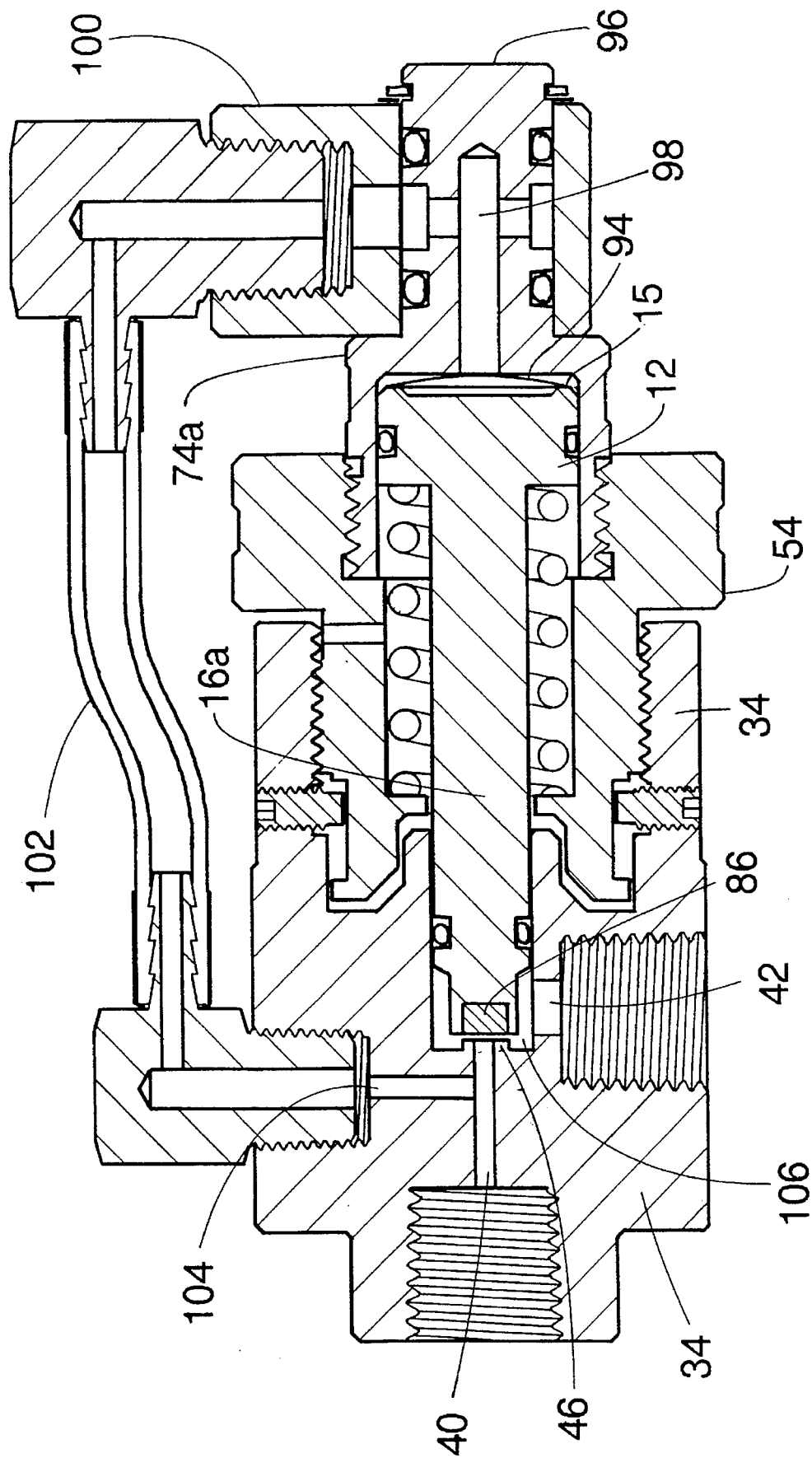
FIG. 5 illustrates a cross-sectional elevational view of an alternate preferred embodiment for Applicant's present invention which includes an external connection tube providing gaseous communication between the high pressure inlet port and the space between the piston head and the cylinder head.

FIG. 5 illustrates another alternate preferred embodiment of Applicant's invention. More specifically, FIG. 5 illustrates first valve body (34) and second valve body (54) containing therein piston (12) having a solid stem (16A) instead of the hollow stem (16) as provided for in the embodiments illustrated above. Having a solid stem, gaseous communication must be provided by another means to the region between top surface (15) of piston (12) and cylinder head (74A). This is done by modifying the cylinder head of previous embodiments in the manner set forth in FIG. 5 with reference to element (74A). Here, port (104) of first valve body (34) is connected to cylinder head (74A) through use of connection means (102), such as a tube. Connection means (102) is connected to cylinder head (74A) through modifications including cylinder head port (98). Engagement means (100) engageable with stem portion (96) of cylinder head (74A) provides ready connection between connection means (102), here simply a gas tight external connection tube made of brass, copper, or other suitable material. Gas enters high pressure port (42) which is open to chamber (106). As pressure at port (104) drops below cutoff, seat (86) will lift off lip (46), allowing gas from chamber (106) to flow through ports (104) and (40) until back pressure at port (40) is sufficient to urge piston (12) with seat (86) against lip (46).

FIG. 5 is also used to illustrate the use of bias means (94) for preloading piston (12) for urging towards low pressure port (40). Bias means (94) here is a spring steel cylindrical washer. Applicant has found that providing a preloading condition such as bias means (94) produces increased sensitivity of cutoff pressure adjustment, especially when providing a cut-off pressure in the ranges up to about 60 pounds per square inch. Use of bias means (94), of course, can be provided with embodiments illustrated earlier, not just the embodiment illustrated in FIG. 5.

Terms such as "left," "right," "up," "down," "bottom," "top," "front," "back," "in," "out," and like are applicable to the embodiments shown and described in conjunction with the drawings. These terms are merely for purposes of description and do not necessarily apply to the position or manner in which the invention may be constructed for use.

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

What is claimed is:

1. A fluid pressure regulator capable of adjustably setting a pre-selected cut-off pressure, the pressure regulator comprising:

a piston having a piston body with a piston face on an upper surface thereof, with side walls and with a lower surface and further having a piston stem with a removed first end having walls defining a stem face and a second end;

a first valve body having an inner wall surface defining a first chamber, the first chamber walls defining a high pressure port, defining a low pressure port and further having walls defining a stem receiving member dimensioned to maintain the stem face of said piston opposite one of said high pressure or low pressure ports;

a second valve body having walls defining a piston head chamber for receipt of said piston head therein;

first sealing means for providing a substantially fluid tight seal between the outer walls of the piston stem and the walls of the stem receiving member of said first valve body;

second sealing means for providing a substantially fluid tight seal between the head of said second valve body and the side walls of the piston body;

first bias means for engaging said second valve body and the piston body to urge the stem of said piston away from the high pressure port;

means for providing fluid communication between the first chamber and the piston head chamber;

valve seat located between the stem face of said piston stem and one of said high pressure or low pressure ports of said first valve body; and coupling means capable of adjustably engaging said first and said second valve bodies to vary the distance between the stem face of said piston stem and said first valve body;

wherein adjusting said coupling means to increase the distance between the stem face and the first valve body will increase the cut-off pressure and decreasing the distance will decrease the cut-off pressure.

2. The fluid pressure regulator of claim 1 further including second bias means for urging said piston towards said first valve body.

3. The fluid pressure regulator of claim 2, wherein said coupling means further comprises walls integral with the first valve body and walls integral with the second valve body, the walls capable of being threadably engaged.

4. The fluid pressure regulator of claim 2, wherein said first and second sealing means are comprised of sealing rings.

5. The fluid pressure regulator of claim 2, wherein said valve seat is a non-metallic plug, and wherein the stem face is dimensioned to include an indented portion, the non-metallic plug being insertable in an indented portion of the first end of the stem of said piston.

6. The fluid pressure regulator of claim 2 further comprising means to lock said first valve body to said second valve body.

7. The fluid pressure regulator of claim 6, wherein said lock means comprises a multiplicity of set screws in said first valve body for engaging outer walls of said second valve body.

8. The fluid pressure regulator of claim 1, wherein the means for providing fluid communication between the first chamber and the piston head chamber comprises an external tube.

9. The fluid pressure regulator of claim 8 further including second bias means for urging said piston towards said first valve body.

10. The fluid pressure regulator of claim 8, wherein said coupling means further comprises walls integral with the first valve body and walls integral with the second valve body, the walls capable of being threadably engaged.

11. The fluid pressure regulator of claim 8, wherein said first and second sealing means are comprised of sealing rings.

12. The fluid pressure regulator of claim 8, wherein said valve seat is a non-metallic plug, and wherein the stem face is dimensioned to include an indented portion, the non-metallic plug being insertable in an indented portion of the first end of the stem of said piston.

13. The fluid pressure regulator of claim 8 further comprising means to lock said first valve body to said second valve body.

14. The fluid pressure regulator of claim 8, wherein said lock means comprises a multiplicity of set screws in said first valve body for engaging outer walls of said second valve body.

15. The fluid pressure regulator of claim 1, wherein said means for providing fluid communication between the first chamber and the piston head chamber comprising walls defining a channel through the piston stem and piston body.

16. The fluid pressure regulator of claim 15 further including second bias means for urging said piston towards said first valve body.

17. The fluid pressure regulator of claim 16, wherein said coupling means further comprises walls integral with the first valve body and walls integral with the second valve body, the walls capable of being threadably engaged.

* * * * *